United States Patent [19]

Kawachi et al.

[11] Patent Number: 5,198,494
[45] Date of Patent: Mar. 30, 1993

[54] ADHESIVE RESIN COMPOSITION, LAMINATE COMPRISING THIS COMPOSITION AS ADHESIVE LAYER

[75] Inventors: Hideshi Kawachi; Masaharu Mito; Mikio Nakagawa, all of Kuga, Japan

[73] Assignee: Mitsui Petrochemical Industries, Ltd., Tokyo, Japan

[21] Appl. No.: 704,889

[22] Filed: May 23, 1991

[30] Foreign Application Priority Data

May 28, 1990 [JP] Japan .................................. 2-138023

[51] Int. Cl.$^5$ ............................................. C08G 63/91
[52] U.S. Cl. ......................................... 525/71; 525/78
[58] Field of Search ..................................... 525/78, 71

[56] References Cited

U.S. PATENT DOCUMENTS

| 4,198,327 | 4/1991 | Matsumoto et al. | 525/78 |
| 4,298,712 | 11/1981 | Machonis, Jr. et al. | 525/80 |
| 4,900,612 | 2/1990 | Sato et al. | |
| 4,983,435 | 1/1991 | Ueki et al. | 525/78 |

FOREIGN PATENT DOCUMENTS

| 202954 | 11/1986 | European Pat. Off. |
| 0322045 | 6/1989 | European Pat. Off. |
| 0367165 | 5/1990 | European Pat. Off. |
| 0412503 | 2/1991 | European Pat. Off. |
| 2176025 | 10/1973 | France |
| 64-45445 | 2/1989 | Japan |
| 1422561 | 1/1976 | United Kingdom |

Primary Examiner—Robert E. Sellers
Assistant Examiner—David Aylward
Attorney, Agent, or Firm—Sherman and Shalloway

[57] ABSTRACT

An adhesive resin composition comprising 1 to 30 parts by weight of a graft copolymerized polypropylene grafted partially or totally with 0.01 to 15 weight % of an unsaturated carboxylic acid or its derivatives and 100 parts by weight of a soft polymer, wherein the soft polymer is a styrene elastomer.

8 Claims, No Drawings

ADHESIVE RESIN COMPOSITION, LAMINATE COMPRISING THIS COMPOSITION AS ADHESIVE LAYER

BACKGROUND OF THE INVENTION

1. Field of the Invention

The present invention relates to an adhesive resin composition and a laminated material for which said adhesive resin composition is used, and more particularly an adhesive resin composition whose adhesivity is not impaired even in case it contacts with hot water, and a laminated material obtained by using said adhesive composition which has an excellent gas barrier property and is capable of withstanding treatment in retort.

2. Description of the Related Art

Polyester resins represented by polyethylene terephthalate resin are excellent in mechanical strength, rigidity, heat resistance, chemical resistance, oil resistance, and transparency, and have been extensively used as a packaging material, such as a film, sheet and container. The polyester resins, however, could not be used as a packaging material for high gas barrier property, since gas permeability thereof is so high against such gas as oxygen.

Polycarbonates, too, could not be used as a packaging material for which a high gas barrier property is required, such as for foodstuff, since gas permeability thereof is so high against such gas as oxygen, although they are excellent in transparency, heat resistance, and organoleptic property.

To increase the gas barrier property of polyethylene terephthalate resin or polycarbonate resin, there have been proposed methods to laminate the polyethylene terephthalate resin or polycarbonate resin with a resin having superior gas barrier property to said resins, such as saponified ethylene-vinyl acetate copolymers. However, the adhesive strength between the polyethylene terephthalate resin or polycarbonate resin and the saponified ethylene-vinyl acetate copolymer is not sufficient, and there are drawbacks such that partial delamination occurs during the lamination stage or service to deteriorate the gas barrier property or impair the appearance or mechanical strength of the prepared product.

To overcome such drawbacks, for example, Japanese Laid-open Application No. 61-270155 and Japanese Laid-open Application No. 62-158043 disclose a laminated material comprising a polycarbonate layer or a polyester layer and a saponified ethylene-vinyl acetate copolymer layer which are bonded to each other with an intermediate layer consisting of a graft copolymerized ethylene/α-olefin random copolymer grafted with an unsaturated carboxylic acid or its derivative. Although such laminated material has excellent adhesive property at ordinary temperatures as well as excellent gas barrier property, there have still remained problems such that the adhesivity of the laminated material often deteriorates with heat when it undergoes heat treatment such as high temperature packing or treatment in retort, thus causing delamination of the bonded layers with the result that the gas barrier property is impaired.

Furthermore, there is disclosed in Japanese Patent Application No. 64-45445, which pertains to the present inventors, an adhesive resin composition having a graft ratio between 0.01 and 3 weight % for the composition as a whole, a melt flow rate between 0.1 and 50 g/10 minutes and a degree of crystallinity of less than 35%, comprising (a) 95 to 50 weight % of an ethylene/α-olefin copolymer having a melt flow rate between 0.1 and 50 g/10 minutes, a density between 0.850 and 0.900 g/cm$^3$, an ethylene content between 75 and 95 mole %, and a degree of crystallinity by X-ray diffraction of less than 30%, (b) 5 to 50 weight % of an ethylene-vinyl acetate copolymer having a melt flow rate between 0.1 and 50 g/10 minutes, and a vinyl acetate content between 5 and 40 weight %, and (c) a graft copolymerized polypropylene grafted particially or totally with 0.05 to 15 weight % of an unsaturated carboxylic acid or its derivatives having a melt flow rate between 0.1 and 50 g/10 minutes, a density between 0.900 and 0.980 g/cm$^3$, and a degree of crystallinity by X-ray diffraction of 30% or higher, said graft copolymerized polyethylene being contained at a ratio between 1.0 and 30 weight % of the total weight of the aforementioned (a) and (b), wherein said adhesive resin composition does not deteriorate its adhesivity between layers of a laminated material even after high temperature treatment such as high temperature packing or treatment in retort; and a laminated material constructed of a polyester layer or a polycarbonate layer, an intermediate layer consisting of said adhesive resin composition and a saponified olefinvinyl acetate copolymer layer.

Although, the aforementioned adhesive resin composition maintains excellent adhesive property at ordinary temperatures after high temperature treatment, it has caused at times delamination in the aforementioned laminated material during high temperature packing or treatment in retort.

Thus, it has been desired to develop an adhesive resin composition which can completely prevent the laminated material from delamination even during high temperature packing or treatment in retort.

OBJECTS OF THE INVENTION

An object of this invention is to provide an adhesive resin composition which imparts such an excellent heat resistant adhesive property as is capable of completely preventing the laminated material from delamination even while it is being subjected to a severe treatment such as high temperature packing and treatment in retort, as well as being capable of keeping a practical bond strength at ordinary temperatures after high temperature treatment.

Another object of the present invention is to provide a laminated material comprising a polycarbonate layer or a polyalkylene terephthalate layer bonded to a saponified ethylene-vinyl acetate layer using the aforementioned adhesive resin composition, said laminated material having an excellent gas barrier property and also being free of delamination while it undergoes high temperature packing or treatment in retort.

SUMMARY OF THE INVENTION

The first adhesive resin composition of the present invention is an adhesive resin composition comprising 1 to 30 weight parts (parts by weight) of a graft copolymerized polypropylene grafted partially or totally with 0.01 to 15 weight % of an unsaturated carboxylic acid or its derivative and 100 weight parts (parts by weight) of a soft polymer, wherein said soft polymer is a styrene elastomer.

The second adhesive resin composition of the present invention is an adhesive resin composition comprising 1 to 30 weight parts (parts by weight) of a graft copolymerized polypropylene partially or totally grafted with 0.01 to 15 weight % of an unsaturated carboxylic acid or its derivative and 100 weight parts (parts by weight) of a soft polymer, wherein said soft polymer comprises (a) 20 to 100 weight % of a styrene elastomer, and (b) 80 to 0 weight % of an ethylene/α-olefin copolymer containing 45 to 95 mole% of ethylene.

The third adhesive resin composition of the present invention is an adhesive resin composition comprising 1 to 30 weight parts (parts by weight) of a graft copolymerized polypropylene partially or totally grafted with 0.01 to 15 weight % of an unsaturated carboxylic acid or its derivative and 100 weight parts (parts by weight) of a soft polymer, wherein said soft polymer comprises (a) 20 to 100 weight % of a styrene elastomer, and (c) 80 to 0 weight % of an ethylene-vinyl acetate copolymer containing 5 to 40 weight % of vinyl acetate.

The fourth adhesive resin composition of the present invention is an adhesive resin composition comprising 1 to 30 weight parts (parts by weight) of a graft copolymerized polypropylene partially or totally grafted with 0.01 to 15 weight % of an unsaturated carboxylic acid or its derivative and 100 weight parts (parts by weight) of a soft polymer, wherein said soft polymer comprises (a) 20 to 100 weight % of a styrene elastomer, (b) 0 to 80 weight % of an ethylene/α-olefin copolymer containing 45 to 95 mole% of ethylene, and (c) 0 to 80 weight % of an ethylene-vinyl acetate copolymer containing 5 to 40 weight % of vinyl acetate.

The first laminated material of the present invention comprises (I) a polyalkylene terephthalate resin layer, (II) an adhesive layer consisting of either one of the adhesive resin compositions, mentioned above, and (III) a saponified olefin-vinyl acetate copolymer layer.

The second laminated material of the present invention comprises (I) a polycarbonate resin layer, (II) an adhesive layer comprising either one of the adhesive resin compositions, mentioned above, and (III) a saponified olefin-vinyl acetate copolymer layer.

DETAILED DESCRIPTION OF THE INVENTION

The adhesive resin composition of the present invention and the laminated material for which said composition is used are now described in detail as follows:

The adhesive resin composition of the present invention comprises a styrene elastomer and a graft copolymerized polypropylene as the essential components, and may include in addition to said essential components, an ethylene/α-olefin copolymer and an ethylene-vinyl acetate copolymer.

Now, said components are described in detail as follows:

STYRENE ELASTOMER

The styrene elastomer generally has polystyrene blocks and intermediate rubber blocks, and the polystyrene part provides a physical crosslinking (domain) which forms a crosslinking point, and the intermediate rubber blocks impart rubber elasticity to the material obtained therefrom. The styrene elastomer used in the present invention may be a block copolymer (SEBS) consisting of ethylene-butylene (EB) block as the intermediate soft segment and polystyrene (S) block as the terminal hard segment. Such styrene elastomer is manufactured and marketed by Shell Kagaku K.K. under the tradename of "Kraton G."

GRAFT COPOLYMERIZED POLYPROPYLENE

The graft copolymerized polypropylene used in the present invention is obtained by partially or totally grafting an unsaturated carboxylic acid or its derivative onto polypropylene.

Polypropylenes used as the raw material for the graft copolymerized polypropylene of the present invention are either propylene homopolymer or propylene copolymers obtained by copolymerizing propylene with 15 mole% or less of another α-olefin, such as ethylene, 1-butene, 3-methyl-1-butene, 1-hexene, and 4-methyl-1-pentene. It is preferable that polypropylene used in the present invention has a flow index according to ASTM D-1238 (230° C.) within the range of from 0.1 to 50.

In the present invention, a monomer to be grafted onto polypropylene (hereinafter referred to as "graft monomer") is unsaturated carboxylic acids or derivatives thereof. There can be mentioned as specific examples of such unsaturated carboxylic acids: acrylic acid, methacrylic acid, maleic acid, fumaric acid, and itaconic acid. As derivatives of unsaturated carboxylic acids, there can be mentioned acid anhydrides, esters, amides, imides, and metal salts. As specific examples of such unsaturated carboxylic acid derivatives, there can be mentioned: maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, maleic acid monoamide, maleic acid diamide, maleic acid N-monoethylamide, maleic acid N,N-diethylamide, maleic acid N-monobutylamide, maleic acid N,N-dibutylamide, fumaric acid monoamide, fumaric acid diamide, fumaric acid N-monoethylamide, fumaric acid N,N-diethylamide, fumaric acid N-monobutylamide, fumaric aicd N,N-dibutylamide, maleimide, N-butylmaleimide, N-phenylmaleimide, sodium acrylate, sodium methacrylate, potassium acrylate, and potassium methacrylate. It is most desirable that maleic anhydride is used from among the aforementioned graft monomers.

Various known processes can be employed to produce modified copolymers by graft copolymerization of polypropylene with a graft monomer. For example, the graft copolymerization may be carried out in a manner where polypropylene and a graft monomer are heated together at an elevated temperature in the presence of or in the absence of a solvent and with or without a radical initiator. In the reaction, other vinyl monomers such as styrene may coexist additionally.

It is preferable that the amount of graft monomer to be grated onto polypropylene (hereinafter referred to as "graft ratio") is controlled so that the graft ratio of the whole composition is in the range of from $10^{-4}$ to 5 weight %. Although it is desirable in the industrial-scale production that a modified polypropylene having a graft ratio between $10^{-2}$ and 6 weight % is manufactured in advance, and then this modified polypropylene is mixed with unmodified polypropylene, since the concentration of graft monomer in the composition may be adequately adjusted, the grafting may also be carried out by blending a predetermined quantity of a graft monomer with polypropylene from the outset.

ETHYLENE-ALPHA-OLEFIN COPOLYMER

According to the present invention, the melt viscosity of the adhesive resin composition of the present invention can be reduced, and the processability can be thereby improved by including an ethylene/α-olefin copolymer in addition to the aforementioned styrene elastomer and graft copolymerized polypropylene, whereby adhesive property after treatment in retort can be furthermore improved. Additionally, the adhesive property of the adhesive resin composition to polyolefins can be enhanced.

In this ethylene/α-olefin copolymer, ethylene is randomly copolymerized with α-olefins, and in the present invention ethylene/α-olefin copolymers having an ethylene content between 45 and 95 mole%, or preferably between 45 and 90 mole%, are used.

The ethylene/α-olefin copolymer used in the present invention has a melt flow rate (ASTM D 1238, Condition E) in general between 0.1 and 50 g/10 minutes, or preferably between 0.3 and 30 g/10 minutes, a density ordinarily between 0.850 and 0.900 g/cm$^3$, or preferably between 0.850 and 0.890 g/cm$^3$, and a degree of crystallinity by X-ray diffraction of generally 30% or less, or preferably less than 25%.

As α-olefins as a component of the ethylene/α-olefin copolymer, α-olefins having between 3 and 20 carbon atoms may be used. Specific examples of such α-olefins are propylene, 1-butene, 1-hexene, 4-methyl-1-pentene, 1-octene, 1-decene, 1-tetradecene, and 1-octadecene. These α-olefins may be used alone or as a mixture of two or more.

The aforementioned ethylene/α-olefin copolymer ordinarily has a melting point (ASTM D3418) of 100° C. or lower.

ETHYLENE-VINYL ACETATE COPOLYMER

An ethylene-vinyl acetate copolymer can be added to the adhesive resin composition of the present invention, in addition to the aforementioned styrene elastomer and graft copolymerized polypropylene, or in addition to the aforementioned styrene elastomer, graft copolymerized polypropylene and ethylene/α-olefin copolymer. By such inclusion of ethylene-vinyl acetate copolymer, the melt viscosity of the adhesive resin composition of the present invention can also be lowered, improving the processability of the composition, and, at the same time, the adhesive property after treatment in retort can be furthermore improved.

In the present invention, ethylene-vinyl acetate copolymers having a vinyl acetate content between 5 and 40 weigh %, or preferably between 10 to 35 weight %, are used.

The ethylene-vinyl acetate copolymers used in the present invention generally have a melt flow rate (ASTM D 1238, Condition E) between 0.1 and 50 g/10 minutes, or preferably between 0.3 and 30 g/10 minutes.

BLENDING RATIO

In the adhesive resin composition of the present invention, the graft copolymerized polypropylene is used at a ratio of 1 to 30 weight parts, or preferably 2 to 28 weight parts, to 100 weight parts of the soft polymer.

In one embodiment of the present invention, the soft polymer is a styrene elastomer.

In another embodiment of the present invention, the ethylene/α-olefin copolymer is admixed with the styrene elastomer as a soft polymer. In this case, the soft polymer is composed of 20 to 100 weight %, or preferably 20 to 90 weight %, of the styrene elastomer, and 0 to 80 weight %, or preferably 10 to 80 weight %, of the ethylene/α-olefin copolymer, provided that the total weight of the styrene elastomer and the ethylene/α-olefin copolymer is 100 weight %.

In a still further embodiment of the present invention, the ethylene-vinyl acetate copolymer is added to the said styrene elastomer as a soft polymer. In this case, the amount of styrene elastomer is between 20 and 100 weight %, or preferably between 20 and 90 weight %, and the amount of ethylene-vinyl acetate copolymer is between 0 and 80 weight %, or preferably between 10 and 80 weight %, provided that the total weight of the styrene elastomer and the ethylene-vinyl acetate copolymer is 100 weight %.

Moreover, in the present invention, both of the ethylene/α-olefin copolymer and the ethylene-vinyl acetate copolymer may be added to the aforementioned styrene elastomer as a soft polymer. In this case, the amounts added are 20 to 100 weight %, or preferably 20 to 90 weight %, of styrene elastomer, 0 to 80 weight %, or preferably 10 to 70 weight %, of ethylene/α-olefin copolymer, and 0 to 80 weight %, or preferably 10 to 70 weight % of ethylene-vinyl acetate copolymer, provided that the total weight of the styrene elastomer and the ethylene/α-olefin copolymer and the ethylene-vinyl acetate copolymer is 100 weight %.

The adhesive resin composition of the present invention includes as essential components the styrene elastomer and the graft copolymerized polypropylene, and the graft ratio of this composition as a whole is generally between 0.01 and 3 weight %, or preferably between 0.05 and 2.5 weight %, and the melt flow rate is between 0.1 and 50 g/10 minutes, or preferably between 0.2 and 40 g/10 minutes, and the degree of crystallinity is less than 35%.

The adhesive resin composition of the present invention consists of the aforementioned styrene elastomer and the graft copolymerized polypropylene, and, furthermore, is blended with the ethylene/α-olefin copolymer and/or the ethylene-vinyl acetate copolymer. The composition of the present invention can be produced from these components by using either one of the known methods, for example, mixing them in a Henschel mixer, a V-blender, a ribbon blender, and a tumbler blender, within the aforementioned amount ranges, or melt kneading the material thus obtained by passing it through a single screw or a double screw extruder, a kneader or a Banbury mixer and then pelletizing or pulverizing the material kneaded.

In addition to the aforementioned components, additives such as heat stabilizers, weathering stabilizers, antistatic agents, pigments, dyestuffs, and rust preventives may be added to the adhesive resin composition of the present invention so far as the object of the present invention is not impaired.

Next, the laminated material of the present invention is described. The laminated material of the present invention is constructed of (I) a polyalkylene terephthalate resin layer or a polycarbonate resin layer, (II) an adhesive layer comprising the said adhesive resin composition, and (III) a saponified olefin-vinyl acetate copolymer layer.

The layer (I) which is a constituent of the laminated material of the present invention is selected from polyalkylene terephthalate resins or polycarbonate resins.

The polyalkylene terephthalate resin is a polyester formed with aliphatic glycols, such as ethylene glycol, propylene glycol, 1,4-butane diol, neopentyl glycol, and hexamethylene glycol; alicyclic glycols, such as cyclohexane dimethanol; aromatic dihydroxy compounds, such as bisphenol; or two or more dihydroxy compound units selected from said compounds; and aromatic dicarboxylic acids, such as terephthalic acid, isophthalic acid, and 2,6-naphthalene dicarboxylic acid; aliphatic dicarboxylic acids, such as oxalic acid, succinic acid, adipic aliphatic, sebalic acid, and undecadicarboxylic acid; alicyclic dicarboxylic acids, such as hexahydroterephthalic acid; or two or more dicarboxylic acid units selected from said compounds, and may be modified with a small amount of polyhydroxy compounds or polycarboxylic acids of trivalence or of a higher valence, such as triols, and tricarboxylic acids. As examples of these thermoplastic polyesters, there can be mentioned polyesters, polyethylene terephthalates, polybutylene terephthalate, and polyethylene isophthalate terephthalate copolymers.

The polycarbonate resins are various kinds of polycarbonates and copolycarbonates obtained by reacting dihydroxy compounds with phosgene or diphenylcarbonate by any known method. As dihydroxy compounds, there can be specifically mentioned hydroquinone, resorcinol, 4,4'-dihydroxy-diphenyl-methane, 4,4'-dihydroxy-diphenyl-ethane, 4,4'-dihydroxy-diphenyl-n-butane, 4,4'-dihydroxy-diphenyl-heptane, 4,4'-dihydroxy-diphenyl-phenyl-methane, 4,4'-dihydroxy-diphenyl-2,2-propane (bisphenol A), 4,4'-dihydroxy-3,3'-dimethyl-diphenyl-2,2-propane, 4,4'-dihydroxy-3,3'-diphenyl-diphenyl-2,2-propane, 4,4'-dihydroxy-dichloro-diphenyl-2,2-propane, 4,4'-dihydroxy-diphenyl-1,1-cyclopentane, 4,4'-dihydroxy-diphenyl-1,1-cyclohexane, 4,4'-dihydroxy-diphenyl-methyl-phenyl-methane, 4,4'-dihydroxy-diphenyl-ethyl-phenyl-methane, 4,4'-dihydroXy-diphenyl-2,2,2-trichloro-1,1-ethane, 2,2'-dihydroxy-diphenyl, 2,6-dihydroxy-naphthalene, 4,4'-dihydroxy-phenylether, 4,4'-dihydroxy-3,3'-dichloro-diphenylether, and 4,4'-dihydroxy-2,5-diethoxyphenyl-ether. Of these compounds, polycarbonates obtained by using 4,4'-dihydroxy-diphenyl-2,2-propane (bisphenol A) are preferred in view of its excellent mechanical properties and transparency.

For the adhesive layer (II) which comprises a constituent of the laminated material of the present invention, the aforementioned adhesive resin composition of the present invention is used.

The layer (III) which is a constituent of the laminated material of the present invention is constructed of a saponified olefin-vinyl acetate copolymer, which being so prepared that an olefin-vinyl acetate copolymer containing 15 to 60 mole %, or preferably 25 to 50 mole % of olefin, is saponified to the extent that the degree of saponification is 50% or more, or preferably 90% or more. So far as the olefin content is within the aforementioned range, the thermal decomposition hardly takes place, the melt molding is made easier, and an excellent drawability and water resistance are attained as well as an excellent gas barrier property. If the degree of saponification is 50% or higher, the gas barrier property attained is further improved.

As olefins copolymerized with vinyl acetate, there can be mentioned as specific examples ethylene, propylene, 1-butene, 1-hexene, 4-methyl-1-pentene, 1-octene, 1-decene, 1-tetradecene, and 1-octadecene. Among these olefins, ethylene is preferably used in the light of the resultant mechanical strength and processability.

To manufacture the laminated material of the present invention, there can be employed, for example, the coextrusion method which comprises the melting polyalkylene terephthalate resin or polycarbonate resin, the adhesive resin composition, and the saponified olefin-vinyl acetate copolymer in separate extruders respectively, feeding the melts into a three-layer die and coextruding said three materials into the form of a laminated material having the adhesive resin composition interposed as the middle layer, or the sandwich lamination method which comprises forming a polyalkylene terephthalate layer or a polycarbonate resin layer and a saponified olefin-vinyl acetate copolymer layer and melt extruding the adhesive resin composition into the space between said two layers. Of these methods, the coextrusion method is preferred with respect to the interface bond strength.

There can be mentioned, as coextrusion methods, the T-die method, for which a flat die is used, and the blown film method, for which an annular or circular die is used. For the flat die, either the single manifold type with a feed block incorporated in it or the multimanifold type may be used. For the annular die employed for the blown film method, a die of any known type may be used.

Although any adequate thickness may be determined in accordance with the intended application for each layer in the laminated material of the present invention, it is preferable that the thickness of the polyalkylene terephthalate resin layer or the polycarbonate resin layer be between 0.02 and 5 mm, the thickness of the adhesive layer be between 0.01 and 1 mm, and the thickness of the ethylene-vinyl acetate layer be between 0.01 and 1 mm in cases where the laminated material is obtained as a sheet or a film.

The laminated material of the present invention may be constructed so that two layers (I) are placed at the both sides to form a (I)/(II)/(III)/(II)/(I) structure, or may be constructed with additional polyolefin layers to form, for example, a laminate having a structure of (Polypropylene)/(II)/(III)/(II)/(I), or a laminate having a structure of (Polyethylene)/(II)/(III)/(II)/(I).

EFFECTS OF THE INVENTION

When the adhesive resin composition II of the present invention is used to bond the layer (I) selected from polyalkylene terephthalate resins or polycarbonate resins to a saponified polyolefin-vinyl acetate copolymer layer (III), it bonds the layer (I) to the layer (III) firmly, the laminated material obtained does not delaminate between the layer (I) and the layer (III) even under high temperature conditions, represented by high temperature packing or treatment in retort, and, moreover, retains its practically sufficient bond strength at room temperatures after the high temperature treatment.

Accordingly, the laminated material constructed by laminating the layer (I) and the layer (III) together has excellent properties required for retort food packaging materials owing its low permeability to gas such as oxygen besides the aforementioned preferred properties.

The present invention will now be described in detail with reference to the following examples and comparative examples that by no means limit the scope of the invention.

In these examples, the degree of crystallinity and the density were determined as follows:

(1) Preparation of samples: Test samples were prepared by heating the subject material in a hot press maintained at 180° C. for 10 minutes, and quenching it in a cooling press (water cooled).

(2) Degree of crystallinity: Measurements were conducted by the X-ray diffractometer from samples prepared according to (1) above.

(3) Density: Measurements were conducted by the density gradient tube method at 23° C. on samples prepared according to (1) above.

EXAMPLE 1

A 5-layer laminated sheet is formed by using a composition (1) composed of 95 weight parts of a styrene-ethylene-butene copolymer (hereinafter referred to as "SEBS"; tradename: Kraton G1652; manufactured by Shell Kagaku K.K.) and 5 weight parts of a graft copolymerized polypropylene obtained by grafting 2 weight parts of maleic anhydride onto polypropylene (the melt index of 12; the density of 0.91 g cm$^3$)(hereinafter referred to as "MAH-PP-1"), polycarbonate (hereinafter referred to as "PC"; the tradename Teijin Panlite L-1250; manufactured by Teijin Kasei Co.), a saponified ethylene-vinyl acetate copolymer (hereinafter referred to as "EVOH"; MFR of 1.3 g/10 minutes; the density of 1.19 g/cm$^3$, the ethylene content of 32 mole %, the tradename Kuraray Eval EP-F, manufactured by Kuraray Co., Ltd.), and a polypropylene (hereinafter referred to as "PP"; the tradename "Hi-Pol F401", manufactured by Mitsui Petrochemical Industries, Ltd.), under the following conditions:

The construction of sheet: PC/(1)/EVOH/(1)/PP

The thickness of each layer (microns): 80/50/50/50/80

Extruders:
40 mm diameter extruder 280° C. (for PC)
30 mm diameter extruder 210° C. (for EVOH)
40 mm diameter extruder 230° C. (for PP)

The interface bond strength between the PC layer and the layer (1) (FPC, g/15 mm) in the 5-layer sheet obtained and the interface bond strength the EVOH layer and the layer (1) (FEVOH, g/15 mm) were measured by the T-peeling test at ambient temperatures of 23° C. and 80° C. and at the peeling speed of 300 mm/minute.

After treating the sheet in retort at 131° C. for 30 minutes, the T-peeling tests were carried out under the same conditions as above.

Test results are shown in Table 1.

Next, a 5-layer sheet was formed by using the aforementioned EVOH, a polyethylene terephthalate (PET; J125 manufactured by Mitsui Pet Co. added with a crystallization promoting agent) and PP, under the following conditions:

The construction of the sheet: PET/(1)/EVOH/(1)/PP

The thickness of each layer (microns): 80/50/50/50/80

Extruders:
40 mm diameter extruder 280° C. (for PET)
30 mm diameter extruder 250° C. (for (1))
30 mm diameter extruder 210° C. (for EVOH)
40 mm diameter extruder 230° C. (for PP)

The interface bond strength between the PET layer and the layer (1) (FPET, g/15 mm) in the 5-layer sheet and the interface bond strength between the EVOH layer and the layer (1) (FEVOH, g/15 mm) were measured under the same conditions that were set for the aforementioned PC.

Test results are shown in Table 2.

EXAMPLE 2

A 5-layer sheet was prepared and the T-peeling tests were conducted according to the same procedure as in Example 1 except that instead of the composition (1) used in Example 1, a composition (2) obtained by mixing 50 weight parts of SEBS, 45 weight parts of an ethylene/1-butene random copolymer (hereinafter referred to as "EBR-1"; MFI of 3.6 g/10 minutes, the ethylene content of 85 mole %, the density of 0.89 g/cm$^3$, and the degree of crystallinity of 15%), and 5 weight parts of MAH-PP-1 was used.

Test results are shown in Table 1 and Table 2.

EXAMPLE 3

A 5-layer sheet was prepared and the T-peeling tests were conducted according to the same procedure as in Example 1 except that instead of the composition (1) used in Example 1, a composition (3) obtained by mixing 70 weight parts of SEBS, 20 weight parts of an ethylene-vinyl acetate copolymer (hereinafter referred to as "EVA-1"; MFI of 2.5 g/10 minutes, the vinyl acetate content of 25 mole %), and 10 weights parts of MAH-PP-1 is used.

Test results are shown in Table 1 and Table 2.

EXAMPLE 4

A 5-layer sheet was prepared and the T-peeling tests were conducted according to the same procedure as in Example 1 except that instead of the composition (1) used in Example 1, a composition (4) obtained by mixing 35 weight parts of SEBS, 45 weight parts of EBR-1, 15 weight parts of EVA-1, and 5 weight parts of MAH-PP-1 was used.

Test results are shown in Table 1 and Table 2.

EXAMPLE 5

A 5-layer sheet was prepared and the T-peeling tests were conducted according to the same procedure as in Example 1 except that instead of the composition (1) used in Example 1, a composition (5) obtained by mixing 40 weight parts of SEBS, 30 weight parts of an ethylene-propylene random copolymer (hereinafter referred to as "EPR-1"; MFI of 1.0 g/10 minutes, the ethylene content of 85 mole %; the density of 0.87 g/cm$^3$; the degree of crystallinity of 4%), 20 weight part of EVA-1 and 10 weights parts of MAH-PP-1 is used.

Test results are shown in Table 1.

EXAMPLE 6

A 5-layer sheet was prepared and the T-peeling tests were conducted according to the same procedure as in Example 1 except that instead of the composition (1) used in Example 1, a composition (6) obtained by mixing 60 weight parts of SEBS, 15 weight parts of EBR-1, 15 weight parts of EVA-1, and 10 weight parts of MAH-PP-1 is used.

Test results are shown in Table 1.

COMPARATIVE EXAMPLE 1

A 5-layer sheet was prepared and the T-peeling tests were conducted according to the same procedure as in Example 1 except that instead of the composition (1)

used in Example 1, a composition (7) obtained by mixing 95 weight parts of EBR-1 and 5 weight parts of MAH-PP-1 is used.

ing 40 weight parts of SEBS, 40 weight part of EBR-1, and 20 weight parts of EVA-1 is used.

Test results are shown in Table 1.

TABLE 1

| | Components of adhesive resin composition (Wt. pts.) | | PC/EVOH Multilayer sheet | | | | | |
|---|---|---|---|---|---|---|---|---|
| | | | FPC [g/15 mm w] | | | FEVOH [g/15 mm w] | | |
| | | | 23° C. ambient temp. | 80° C. ambient temp. | After retort treatment 23° C. ambient temp. | 23° C. ambient temp. | 80° C. ambient temp. | After retort treatment 23° C. ambient temp. |
| Ex. 1 | SEBS | 95 | 1200 | 910 | 250 | 1300 | 500 | 350 |
| | MAH-PP-1 | 5 | | | | | | |
| Ex. 2 | SEBS | 50 | 1000 | 530 | 320 | 920 | 410 | 320 |
| | EBR-1 | 45 | | | | | | |
| | MAH-PP-1 | 5 | | | | | | |
| Ex. 3 | SEBS | 70 | 1080 | 620 | 450 | 1100 | 430 | 440 |
| | EVA-1 | 20 | | | | | | |
| | MAH-PP-1 | 10 | | | | | | |
| Ex. 4 | SEBS | 35 | 980 | 440 | 300 | 1080 | 400 | 490 |
| | EBR-1 | 45 | | | | | | |
| | EVA-1 | 15 | | | | | | |
| | MAH-PP-1 | 5 | | | | | | |
| Ex. 5 | SEBS | 40 | 750 | 400 | 460 | 1000 | 370 | 380 |
| | EPR-1 | 30 | | | | | | |
| | EVA-1 | 20 | | | | | | |
| | MAH-PP-1 | 10 | | | | | | |
| Ex. 6 | SEBS | 60 | 930 | 520 | 450 | 1100 | 410 | 410 |
| | EBR-1 | 15 | | | | | | |
| | EVA-1 | 20 | | | | | | |
| | MAH-PP-1 | 10 | | | | | | |
| Comp. Ex. 1 | EBR-1 | 95 | 910 | 50 | 110 | 1030 | 30 | 450 |
| | MAH-PP-1 | 5 | | | | | | |
| Comp. Ex. 2 | EBR-1 | 55 | 1600 | 30 | 850 | 1000 | 50 | 250 |
| | EVA-1 | 40 | | | | | | |
| | MAH-PP-1 | 5 | | | | | | |
| Comp. Ex. 3 | SEBS | 40 | 430 | 150 | 200 | 90 | 20 | 10 |
| | EBR-1 | 40 | | | | | | |
| | EVA-1 | 20 | | | | | | |

TABLE 2

| | Components of adhesive resin composition (Wt. pts.) | | PET/EVOH Multilayer sheet | | | | | |
|---|---|---|---|---|---|---|---|---|
| | | | FPET [g/15 mm w] | | | FEVOH [g/15 mm w] | | |
| | | | 23° C. ambient temp. | 80° C. ambient temp. | After retort treatment 23° C. ambient temp. | 23° C. ambient temp. | 80° C. ambient temp. | After retort treatment 23° C. ambient temp. |
| Ex. 1 | SEBS | 95 | 800 | 350 | 250 | 1100 | 480 | 320 |
| | MAH-PP-1 | 5 | | | | | | |
| Ex. 2 | EBR-1 | 95 | 920 | 300 | 400 | 890 | 390 | 380 |
| | EBR-1 | 45 | | | | | | |
| | MAH-PP-1 | 5 | | | | | | |
| Ex. 3 | SEBS-1 | 70 | 890 | 500 | 440 | 1030 | 390 | 450 |
| | EVA-1 | 20 | | | | | | |
| | MAH-PP-1 | 10 | | | | | | |
| Ex. 4 | SEBS | 35 | 600 | 320 | 350 | 1000 | 420 | 410 |
| | EBR-1 | 45 | | | | | | |
| | EVA-1 | 15 | | | | | | |
| | MAH-PP-1 | 5 | | | | | | |

Test results are shown in Table 1.

COMPARATIVE EXAMPLE 2

A 5-layer sheet was prepared and the T-peeling tests were conducted according to the same procedure as in Example 1 except that instead of the composition (1) used in Example 1, a composition (8) obtained by mixing 55 weight parts of EBR-1, 40 weights part of EVA-1, and 5 weight parts of MAH-PP-1 is used.

Test results are shown in Table 1.

COMPARATIVE EXAMPLE 3

A 5-layer sheet was prepared and the T-peeling tests were conducted according to the same procedure as in Example 1 except that instead of the composition (1) used in Example 1, a composition (9) obtained by mix-

What is claimed is:

1. An adhesive resin composition consisting essentially of 1 to 30 parts by weight of a graft copolymerized polypropylene grafted partially or totally with 0.01 to 15 percent by weight of an unsaturated carboxylic acid or its derivative and 100 parts by weight of a soft polymer, wherein said soft polymer is a styrene elastomer of a block copolymer consisting of ethylene-butylene block as an intermediate segment and polystyrene as a terminal segment.

2. An adhesive resin composition consisting essentially of 1 to 30 parts by weight of a graft copolymerized polypropylene grafted partially or totally with 0.01 to 15 percent by weight of an unsaturated carboxylic acid or its derivative and 100 parts by weight of a soft polymer, wherein said soft polymer comprises (a) 20 to 100 percent by weight of a styrene elastomer and (b) 80 to 0 of an ethylene/α-olefin copolymer having an ethylene content between 45 and 95 mole percent, and said styrene elastomer is a block copolymer consisting of ethylene-butylene block as the intermediate segment and polystyrene as the terminal segment.

3. An adhesive resin composition consisting essentially of 1 to 30 parts by weight of a graft copolymerized polypropylene rafted partially or totally with 0.01 to 15 percent by weight of an unsaturated carboxylic acid or its derivative and 100 parts by weight of a soft polymer, wherein said soft polymer comprises (a) 20 to 100 percent by weight of a styrene elastomer and (c) 80 to 0 percent by weight of an ethylene-vinyl acetate copolymer having a vinyl acetate content between 5 and 40 percent by weight, and said styrene elastomer is a block copolymer consisting of ethylene-butylene block as the intermediate segment and polystyrene as the terminal segment.

4. An adhesive resin composition consisting essentially of 1 to 30 parts by weight of a graft copolymerized polypropylene grafted partially or totally with 0.01 to 15 percent by weight of an unsaturated carboxylic acid or its derivative and 100 parts by weight of a soft polymer, wherein said soft polymer comprises (a) 20 to 100 percent by weight of a styrene elastomer, (b) 0 to 80 percent by weight of an ethylene/α-olefin copolymer having an ethylene content between 45 and 95 mole percent, and (c) 0 to 80 percent by weight of an ethylene-vinyl acetate copolymer having a vinyl acetate content between 5 and 40 percent by weight, and said styrene elastomer is a block copolymer consisting of ethylene-butylene block as the intermediate segment and polystyrene as the terminal segment.

5. An adhesive resin composition consisting essentially of 2 to 28 parts by weight of a graft copolymerized polypropylene grafted partially or totally with 0.01 to 15 percent by weight of an unsaturated carboxylic acid or its derivative and 100 parts by weight of a soft polymer, wherein said soft polymer is a styrene elastomer of a block copolymer consisting essentially of ethylene-butylene and polystyrene.

6. An adhesive resin composition consisting essentially of 2 to 28 parts by weight of a graft copolymerized polypropylene grafted partially or totally with 0.01 to 15 percent by weight of an unsaturated carboxylic acid or its derivative and 100 parts by weight of a soft polymer, wherein said soft polymer consists essentially of (a) 20 to 90; percent by weight of a styrene elastomer and (b) 80 to 10 percent by weight of an ethylene/α-olefin copolymer having an ethylene content between 45 and 90 mole percent, and said styrene elastomer is a block copolymer consisting essentially of ethylene-butylene and polystyrene.

7. An adhesive resin composition consisting essentially of 2 to 28 parts by weight of a graft copolymerized polypropylene grafted partially or totally with 0.01 to 15 percent by weight of an unsaturated carboxylic acid or its derivative and 100 parts by weight of a soft polymer, wherein said soft polymer consists essentially of (a) 20 to 90 percent by weight of a styrene elastomer and (c) 80 to 10 percent by weight of an ethylene-vinyl acetate copolymer having a vinyl acetate content between 10 and 35 percent by weight, nd said styrene elastomer is a block copolymer consisting essentially of ethylene-butylene block and polystyrene.

8. An adhesive resin composition consisting essentially of 2 to 28 parts by weight of a graft copolymerized polypropylene grafted partially or totally with 0.01 to 15 percent by weight of an unsaturated carboxylic acid or its derivative and 100 parts by weight of a soft polymer, wherein said soft polymer consists essentially of (a) 20 to 90 percent by weight of a styrene elastomer, (b) 10 to 70 percent by weight of an ethylene/α-olefin copolymer having an ethylene content between 45 and 90 mole percent, and (c) 10 to 70 percent by weight of an ethylene-vinyl acetate copolymer having a vinyl acetate content between 10 and 35 percent by weight, and said styrene elastomer is a block copolymer consisting essentially of ethylene-butylene block and polystyrene.

* * * * *